Aug. 4, 1925.  1,548,635
W. B. SCHULTE
BATTERY
Filed Sept. 1, 1923    2 Sheets-Sheet 1
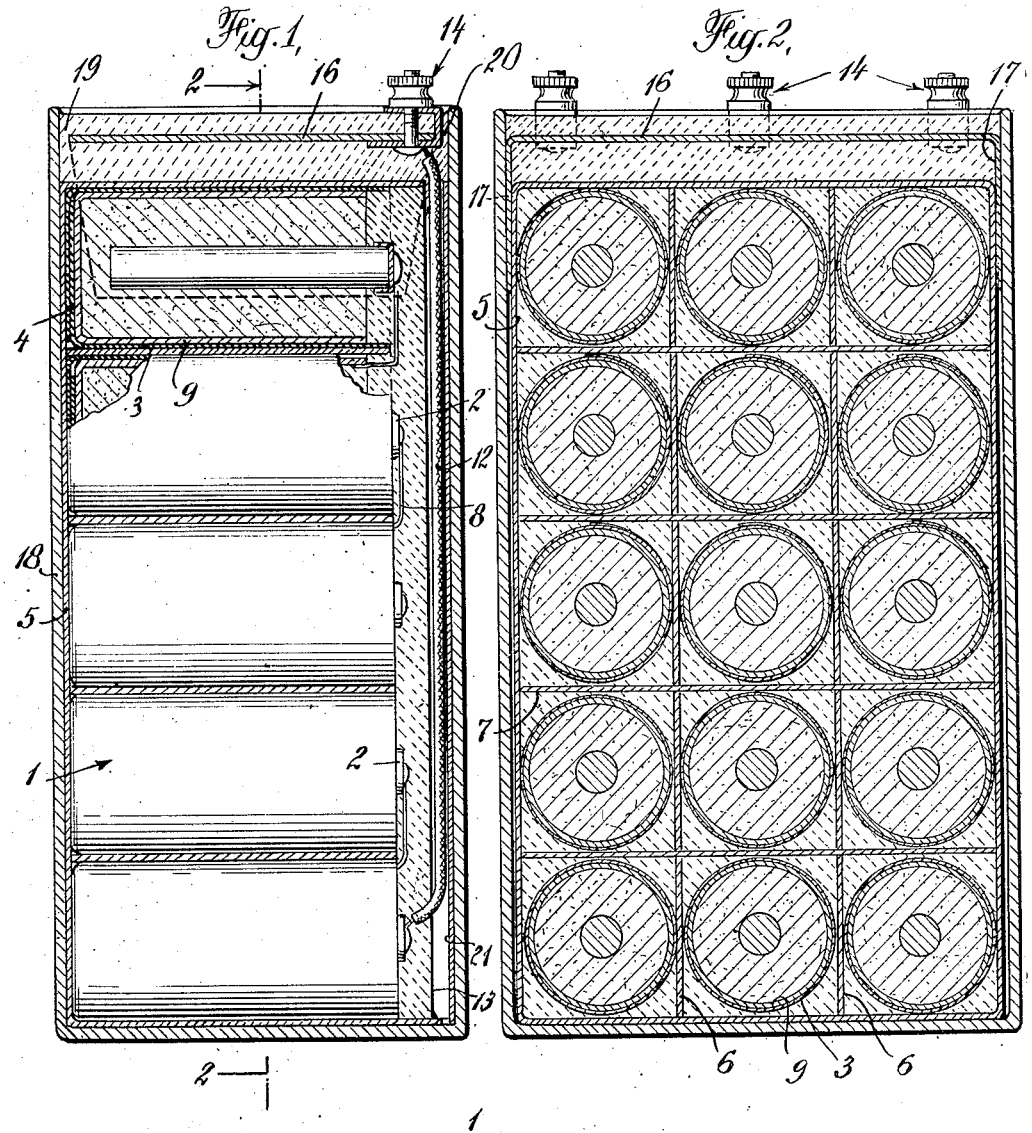

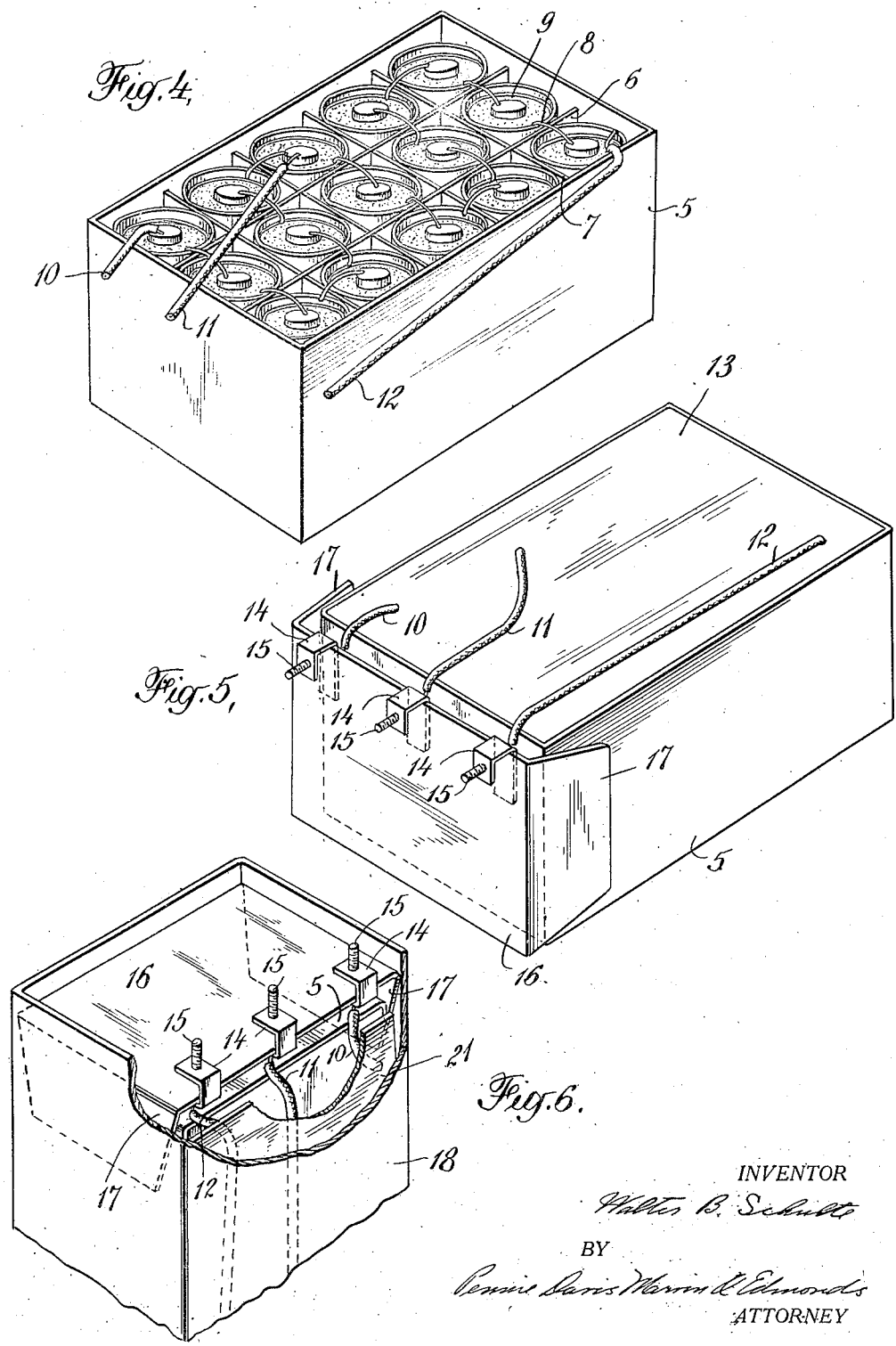

Patented Aug. 4, 1925.

1,548,635

UNITED STATES PATENT OFFICE.

WALTER B. SCHULTE, OF MADISON, WISCONSIN, ASSIGNOR TO BURGESS BATTERY COMPANY, OF MADISON, WISCONSIN, A CORPORATION OF WISCONSIN.

BATTERY.

Application filed September 1, 1923. Serial No. 660,486.

*To all whom it may concern:*

Be it known that I, WALTER B. SCHULTE, a citizen of the U. S., residing at Madison, in the county of Dane, State of Wisconsin, have invented certain new and useful Improvements in Batteries; and I do hereby declare the following to be a full, clear, and exact description of the invention, such as will enable others skilled in the art to which it appertains, to make and use the same.

This invention relates to dry batteries, and comprises certain improvements in the arrangement of the several cells of a battery and in the construction and arrangement of the battery casing and terminals, whereby the terminals are readily accessible from above when the battery rests on one of its smallest faces.

The usual practice in making batteries of the general type to which this invention relates, is to arrange a number of cells vertically within individual compartments formed in a casing or container having the general shape of a tray. The cells are connected in series, certain cells being connected to terminals or binding posts, and the battery is then sealed with wax. The finished battery comprises a unit consisting of a plurality of vertically arranged cells within a casing having the outline of a tray, the area of the bottom of the battery being considerably larger than that of either end.

One of the principal objects of this invention is to provide a battery in which the cells are arranged in such a manner that the battery occupies a minimum space, or, in other words, so that the area of the bottom of the battery is reduced to a minimum. In general, this object is accomplished by arranging the cells so that when the battery is in use, the cells extend horizontally instead of vertically as in the arrangement heretofore employed. For example, in making a battery consisting of 15 cells, I prefer to arrange them so that there are 5 tiers or layers of 3 cells each, the cells of each layer being arranged horizontally. The area of the bottom of this battery is approximately equal to the length of one cell multiplied by three times the diameter of one cell. This area is considerably less than the space occupied by the fifteen vertically arranged cells of an ordinary dry battery. The area of the bottom of the improved battery is substantially smaller than that of any side of the battery, adjacent to the bottom.

In general, the improved battery can be made by constructing a battery of the ordinary type above described, connecting certain of the cells of the battery to terminals provided at one end of the battery, and slipping the battery endwise into a casing, the open end of which is sealed to form the top of the finished battery. In the finished battery the cells are arranged horizontally, and the space required by the battery is approximately that which would be required by an ordinary battery if it were placed on end. If the ordinary battery were placed on end, the terminals of the battery would project out on one side thereof; while with the present invention the same economy of space is provided, and the battery possesses the distinct advantage of having the terminals project above the battery.

In order that the principles of my invention may be more clearly understood, and for the purpose of disclosing certain improved features of construction, I have illustrated in the accompanying drawings and will now describe certain preferred embodiments of the invention. In the accompanying drawings:

Fig. 1 is a vertical section of the improved dry battery, parts being cut away to show the details of construction.

Fig. 2 is a longitudinal section of the improved battery, taken on line 2—2 of Fig. 1.

Fig. 3 is a perspective view of a single cell of the improved dry battery.

Fig. 4 is a perspective view of the improved dry battery at one stage in the process of manufacture.

Fig. 5 is a perspective view of the dry battery shown in Fig. 4, but at a later stage in the process of manufacture.

Fig. 6 is a fragmentary perspective view of the improved dry battery completely assembled, but before the top of the battery has been sealed. Parts are cut away to show the various details of construction.

The preferred manner of making my improved dry battery may be understood by considering Figs. 3 to 6, incl. Fig. 3 shows a single cylindrical cell 1, of more or less conventional type, comprising a zinc receptacle forming one electrode of the cell and an axially disposed carbon rod forming the other electrode, the rod being fitted with the usual metal terminal or cap 2. The zinc receptacle of the cell is enclosed within a water repellent paper wrapper 3. The wrapper 3, which may consist of waxed paper, completely encloses the cell with the exception of the upper end thereof, which is left open. The lower edges of the wrapper are tucked under and folded against the bottom of the cell, as indicated at 4, so that an increased thickness of wrapping is provided at this point.

The inner casing or carton 5 of the battery (see Figs. 4 to 6, incl.) consists of a built-up folded carton, thoroughly impregnated with water-repellent material. This carton 5 is of the ordinary tray-shaped type commonly employed in the making of dry batteries. A nest, consisting of interlocking longitudinal and transverse strips 6 and 7 of pasteboard or other suitable sheet material, is provided within the carton 5, for the purpose of forming individual compartments for the cells of the battery. The several dimensions of the compartments are somewhat greater than those of the cells, so that, under ordinary conditions, the cells are maintained out of contact at all points with the walls of the compartments.

After the cells 1 have been fitted with their paper wrappers 3, the cells are inserted in the compartments and electrically connected together by suitable metallic connecters 8, which extend from the zinc electrode of one cell to the metal cap 2 on the carbon electrode of an adjacent cell. The several connecters 8 may be soldered or otherwise secured to the upper ends of the zinc receptacles 9 and to the brass caps. Suitable insulated wire leads 10, 11 and 12 are then attached to certain of the cells, the leads being of sufficient length to extend to one end of the carton, as shown in Fig. 4. The battery is then tested, and if the cells are found to be in proper condition, the open top of the carton 5 is sealed with a wax seal 13, as shown in Fig. 5. While I prefer to have the leads 10, 11 and 12 exposed, as shown in Fig. 5, yet it is to be understood that these leads may be partially or wholly immersed or embedded in the wax seal 13, if it is so desired.

After the wax seal 13 has hardened, the ends of the leads 10, 11 and 12 are soldered, or otherwise fixed, to clips or terminals 14, which in the form illustrated in the drawings, consist of U-shaped sheet brass pieces each having a binding post 15 threaded or otherwise fixed thereto. The invention is not limited to the employment of any particular type of clip or terminal, for various types, such as Fahnstock clips, spring clips and threaded studs, may be used. I prefer to mount the clips 14 on a strip of sheet material, such as the paper board 16, this paper board having tongues 17 which extend along the sides of the carton 5. The paper board 16 is preferably arranged at an appreciable distance from the adjacent end of the carton 5, for a purpose hereinafter described.

After the battery has been assembled as shown in Fig. 5, it is inserted in an outer casing 18 in the manner shown in Fig. 6; i. e. with the clips 14 projecting from the open end of the outer casing. It will be noted that the clips or terminals 14 are arranged vertically, whereas the cells 1 are arranged horizontally. The inside dimensions of the outer casing should be somewhat greater than the outside dimensions of the carton 5, so that there is ample space provided for the leads 10, 11 and 12, and for the tongues 17, which are inserted between the outer casing and the inner carton to such an extent as to provide a proper clearance between the paper board 16 and the adjacent end of the inner carton 5. The dimensions of the paper board 16 are smaller than the internal dimensions of the outer casing 18, so that an appreciable gap is provided between the edges of the paper board and the inner surfaces of the outer casing, as best shown at 19 and 20 in Fig. 1.

After the inner carton 5 has been inserted within the outer casing 18 in the manner shown in Fig. 6, the battery is completed by sealing the open end of the outer casing 18 with wax. When the molten wax is poured into the open end of the outer casing 18, it flows around and beneath the paper board 8, so as to fill the space below the paper board 8 more or less completely, as shown in Figs. 1 and 2.

The outer casing 18 may be paraffined to prevent the entrance of moisture; but in the event that this outer casing is not impregnated with moisture-proofing material, I prefer to insert a moisture-proof board 21 between the outer casing and the leads 10, 11 and 12. This board 21 may be inserted in the outer casing 18 when the inner carton is inserted in this casing. While the provision of this board or strip of material is not absolutely necessary, yet it serves as an additional safeguard for preventing moisture from conducting current between the leads.

The paper board 16 serves as a convenient support for the clips or terminals 14. The tongues 17, which are preferably integral with the paraffined paper board 16, serve as a means for holding the paper board at the proper distance away from the inner carton, so that the sealing wax will flow in between these parts, and so that the binding posts are supported at the proper elevation to project above the surface of the sealing wax the desired amount.

My improved dry battery has all the advantages of the ordinary battery, the terminals being readily accessible from above the battery; and it possesses the distinct advantage over the ordinary battery of requiring a minimum of space on the table or other support on which the battery is placed.

It is to be understood that this invention is not limited to the particular embodiment illustrated and described, but includes such modifications thereof as fall within the scope of the appended claims. Many of the details of my improved battery, such as the kind, number and arrangement, of the binding posts, leads and cells, may be modified without departing from the spirit of the invention.

I claim:

1. A dry battery comprising a casing, a plurality of electric cells arranged horizontally therein, at least some of said cells being electrically connected in series, a plurality of terminals at the top of said casing to which certain of said cells are connected, and a molded seal for supporting said terminals and serving to seal the top of the casing, the area of the bottom of the casing being substantially smaller than that of any side of the casing adjacent to the bottom.

2. A dry battery comprising a casing, a plurality of individual cells arranged horizontally within said casing and electrically insulated from one another, conductors electrically connecting at least some of said cells in series, a seal covering the cell electrodes, a plurality of terminals arranged vertically at the top of said casing, and leads extending through said seal for connecting certain of said cells to said terminals, the area of the bottom of said casing being substantially smaller than that of any side of the casing adjacent to the bottom.

3. A dry battery comprising a casing, a plurality of individual cells arranged horizontally within said casing and electrically insulated from one another, conductors electrically connecting at least some of said cells in series, a seal covering the cell electrodes, a plurality of terminals arranged vertically at the top of said casing, leads extending through said seal for connecting certain of said cells to said terminals, and a wax seal closing the top of said casing and fixing said terminals in position, the area of the bottom of said casing being substantially smaller than that of any side of the casing adjacent to the bottom.

4. A dry battery comprising a casing, a plurality of electric cells arranged horizontally therein, at least some of said cells being electrically connected in series, a plurality of terminals at the top of said casing to which certain of said cells are connected, and a fusible seal for supporting said terminals and serving to hermetically seal the top of the casing.

5. A dry battery comprising a casing, a plurality of individual cells arranged horizontally within said casing and electrically insulated from one another, conductors electrically connecting at least some of said cells in series, a plurality of terminals arranged vertically at the top of said casing, a strip of sheet material for supporting said terminals, means for holding said strip of sheet material in position, and leads connecting said terminals to certain of said cells.

6. A dry battery comprising a casing, a plurality of individual cells arranged horizontally within said casing and electrically insulated from one another, conductors electrically connecting at least some of said cells in series, a plurality of terminals arranged vertically at the top of said casing, a strip of sheet material for supporting said terminals, said strip of sheet material having tongues for holding the strip of material in position, and leads connecting said terminals to certain of said cells.

7. A dry battery comprising a casing, a plurality of individual cells within said casing and electrically insulated from one another, conductors electrically connecting at least some of said cells in series, a plurality of terminals arranged vertically at the top of said casing, a strip of sheet material for supporting said terminals, said strip of sheet material having integral tongues for holding said strip in position, a seal enveloping said strip and fixing said terminals in position, and leads connecting said terminals to certain of said cells.

8. A dry battery comprising an outer casing, an inner carton arranged on end within said casing, a plurality of individual cells within said inner carton and electrically insulated from one another, conductors electrically connecting at least some of said cells in series, a seal for said inner carton and a second seal for said outer casing.

9. A dry battery comprising an outer casing, an inner carton arranged on end within said casing, a plurality of individual cells arranged horizontally within said carton and electrically insulated from one another, conductors electrically connecting at least some of said cells in series, vertically arranged terminals at the top of said casing, leads connecting said terminals to certain of said cells, a seal for said carton and a second seal for said casing.

10. A dry battery comprising an outer casing, an inner carton arranged on end within said casing, a plurality of individual cells arranged horizontally within said carton and electrically insulated from one another, conductors electrically connecting at least some of said cells in series, vertically arranged terminals at the top of said casing, a seal for said carton, a second seal for said casing, leads extending through said carton seal for connecting said terminals to certain of said cells, and a strip of waterproofed material arranged between said leads and said outer casing.

11. A dry battery comprising an outer casing, an inner carton arranged on end within said outer casing and having a plurality of individual compartments, a plurality of individual cells arranged horizontally within said compartments, conductors electrically connecting at least some of said cells in series, a seal for said carton, a plurality of vertically arranged terminals at the top of said outer casing, a strip of paper board for supporting said terminals, leads connecting said terminals to certain of said cells, and a seal at the top of said casing for fixing said strip of paper board and said terminals in position.

12. A dry battery comprising an outer casing, an inner carton arranged on end within said outer casing, a plurality of individual cells arranged horizontally within said carton and electrically insulated from one another, conductors electrically connecting at least some of said cells in series, a seal for said carton, a plurality of vertically arranged terminals at the top of said outer casing, leads extending through said seal and connecting said terminals to certain of said cells, a strip of paper board for supporting said terminals, means wedged between said inner carton and said outer casing for holding said strip of paper board in position, and a seal enveloping said strip of paper board and the lower ends of said terminals, the area of the bottom of said outer casing being substantially smaller than that of any side of the casing, adjacent to the bottom.

13. A dry battery comprising a casing, a plurality of electric cells arranged horizontally therein, at least some of said cells being electrically connected in series, a wax seal for the top of the casing and conducting members connected with certain of said cells and portions of which extend through said seal for providing conducting paths to points above said seal.

14. The method of assembling a dry battery which comprises placing a plurality of electric cells in a carton with their axes substantially vertical, electrically connecting at least some of the cells in series and connecting conducting members to certain cells, sealing the carton with portions of the conducting members extending through the seal, inserting the sealed carton endwise into a container so that the cells will be horizontally disposed therein, and sealing the top of the container with portions of said conducting members extending through the seal.

15. The method of assembling a dry battery which comprises grouping a plurality of electric cells and electrically connecting at least some of them in series, connecting conducting members to certain cells, placing the group of cells in a container so that the cells are horizontally disposed therein, and sealing the top of the container with portions of said conducting members extending through the seal.

In testimony whereof I affix my signature.

WALTER B. SCHULTE.